US012617280B2

(12) United States Patent
Kunze et al.

(10) Patent No.: US 12,617,280 B2
(45) Date of Patent: May 5, 2026

(54) VISUALIZATION WITH AN AR HUD

(71) Applicant: Volkswagen Aktiengesellschaft, Wolfsburg (DE)

(72) Inventors: Alexander Kunze, Berlin (DE); Vitalij Sadovitch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 161 days.

(21) Appl. No.: 18/547,617

(22) PCT Filed: Feb. 11, 2022

(86) PCT No.: PCT/EP2022/053433
§ 371 (c)(1),
(2) Date: Aug. 23, 2023

(87) PCT Pub. No.: WO2022/189092
PCT Pub. Date: Sep. 15, 2022

(65) Prior Publication Data
US 2024/0131931 A1    Apr. 25, 2024
US 2024/0227559 A9    Jul. 11, 2024

(30) Foreign Application Priority Data
Mar. 9, 2021    (DE) ..................... 10 2021 202 246.4

(51) Int. Cl.
*B60K 35/23*      (2024.01)
*B60K 35/28*      (2024.01)
(Continued)

(52) U.S. Cl.
CPC .............. *B60K 35/23* (2024.01); *B60K 35/28* (2024.01); *B60K 35/29* (2024.01); *B60K 35/654* (2024.01);
(Continued)

(58) Field of Classification Search
None
See application file for complete search history.

(56) References Cited

U.S. PATENT DOCUMENTS

2007/0067089 A1*   3/2007   Yoshida ............. G02B 27/0101
                                             701/96
2009/0204326 A1   8/2009   Knee et al. ................... 701/300
(Continued)

FOREIGN PATENT DOCUMENTS

CN      108375830 A   *   8/2018    ......... G02B 27/0101
CN      111781727 A   *   10/2020    ......... G02B 27/0101
(Continued)

OTHER PUBLICATIONS

DE 102005048336 A1, US 2009/0204326 A1.
(Continued)

*Primary Examiner* — Justin S Lee
(74) *Attorney, Agent, or Firm* — Slayden Grubert Beard PLLC

(57) ABSTRACT

The disclosure relates to a contact-analogous head-up display, in particular an augmented reality head-up display, which places information in direct contact with the environment. Contrary to conventional head-up displays, the items of information appear as part of the environment. The subject matter of the disclosure relates to a dynamic improvement of the visibility of concealed AR elements in situations in which several elements are displayed in parallel.

20 Claims, 6 Drawing Sheets

(51) Int. Cl.
| | |
|---|---|
| *B60K 35/29* | (2024.01) |
| *B60K 35/65* | (2024.01) |
| *B60K 35/81* | (2024.01) |
| *B60K 35/10* | (2024.01) |

(52) U.S. Cl.
CPC .............. *B60K 35/81* (2024.01); *B60K 35/10* (2024.01); *B60K 2360/119* (2024.01); *B60K 2360/166* (2024.01); *B60K 2360/177* (2024.01); *B60K 2360/1868* (2024.01); *B60K 2360/731* (2024.01); *B60K 2360/785* (2024.01)

(56) References Cited

U.S. PATENT DOCUMENTS

| | | | |
|---|---|---|---|
| 2012/0249589 A1 | 10/2012 | Gassner et al. | .............. 345/633 |
| 2013/0076503 A1 | 3/2013 | Ishii et al. | .................... 340/458 |
| 2015/0178985 A1 | 6/2015 | Di Censo et al. | ........... 345/419 |
| 2016/0152184 A1* | 6/2016 | Ogawa | ..................... G08G 1/16 |
| | | | 345/589 |
| 2018/0297511 A1* | 10/2018 | Park | ........................ B60Q 1/143 |
| 2018/0373030 A1* | 12/2018 | Kusanagi | .............. G06V 40/16 |
| 2019/0005727 A1* | 1/2019 | Tanaka | ................. G06V 20/588 |
| 2019/0139286 A1* | 5/2019 | Shimoda | ........... G02B 27/0101 |
| 2019/0168777 A1 | 6/2019 | Lester | |
| 2019/0196184 A1* | 6/2019 | Takizawa | ............. G01C 21/365 |
| 2019/0294895 A1 | 9/2019 | Kleen et al. | |
| 2019/0308502 A1* | 10/2019 | Yoneyama | ............. B60K 35/60 |
| 2021/0155159 A1* | 5/2021 | Kawate | ................... B60R 1/001 |
| 2021/0389596 A1* | 12/2021 | Fujita | ..................... G06V 20/56 |
| 2022/0227384 A1 | 7/2022 | Wyszka et al. | |

FOREIGN PATENT DOCUMENTS

| | | | | |
|---|---|---|---|---|
| CN | 111886534 A | * | 11/2020 | ........... B60K 35/234 |
| DE | 102005048336 A1 | | 4/2007 | .............. B60R 1/10 |
| DE | 102007024395 A1 | | 11/2008 | ............. B60K 35/00 |
| DE | 102011006347 A1 | | 10/2012 | ............. G01C 21/36 |
| DE | 102013010818 A1 | | 12/2013 | ............. G01C 21/36 |
| DE | 102012220100 A1 | | 5/2014 | ............. B60K 35/00 |
| DE | 102013016251 A1 | | 6/2014 | ............. B60R 16/02 |
| DE | 102016203080 A1 | | 8/2017 | ............ B60W 30/08 |
| DE | 102018204254 A1 | | 9/2019 | ............ B60W 30/08 |
| DE | 102019207951 A1 | | 12/2020 | ............ B60W 30/12 |
| DE | 102021202246 A1 | | 9/2022 | ............. B60R 16/02 |
| JP | 2014185926 A | * | 10/2014 | |
| JP | 2016020876 A | * | 2/2016 | |
| JP | 2017030600 A | * | 2/2017 | |
| KR | 20180053396 A | * | 5/2018 | ......... G01C 21/3647 |
| WO | WO-2010109941 A1 | * | 9/2010 | ......... G08G 1/09626 |
| WO | 2022/189092 A1 | | 9/2022 | ............. B60K 35/00 |

OTHER PUBLICATIONS

DE 102011006347 A1, US 2012/0249589 A1.

DE 102018204254 A1, US 2019/0294895 A1.

DE 102019207951 A1, US 2022/0227384 A2.

German Office Action, Application No. 102021202246.4, 7 pages, Feb. 2, 2022.

International Search Report and Written Opinion, Application No. PCT/EP2022/053433, 8 pages, May 9, 2022.

\* cited by examiner

S1

Receiving notice data and vehicle data

S2

Determine output configuration

S3

Generate control command for AR display

S4

Transmit control command to AR display

VISUALIZATION WITH AN AR HUD

CROSS-REFERENCE TO RELATED APPLICATIONS

This application claims priority to German Patent Application No. DE 10 2021 202 246.4, filed on Mar. 9, 2021 with the German Patent and Trademark Office. The contents of the aforesaid patent application are incorporated herein for all purposes.

TECHNICAL FIELD

The invention relates to a device for the improved visualization of a first notice icon and a second notice icon in a motor vehicle, as well as a corresponding system, method and computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In the automotive industry, what are called augmented reality head-up displays—AR HUDs—are known, with which drivers can be supported in the interior by an environment-related display of notices, in particular navigation information and driver assistance interventions. The various functions that an AR HUD shows can occur in parallel. In this case, the information may overlap.

Currently, two possibilities for showing this overlap are known: Individual functions and notices can be weighted with a predefined priority management. If two or more notices should be displayed simultaneously, only the one with the highest priority is displayed. In practice, this leads to safety-critical information such as control interventions of driver assistance systems being prioritized higher than convenience information such as navigation displays. Furthermore, it is known to use a parallel display with a plane concept. In this case, parallel display of functions and icons can be permitted, as a result of which various depictions can overlap with each other. In practice, the overlap of the depictions is derived for this purpose from the real, meaning three-dimensional, world. A depiction that would lie spatially behind another would be concealed by it. However, this leads to the problem that relevant displays are not visible due to this overlap. For example, a safety-critical display, such as a vehicle detected ahead, could be completely concealed by a large, full-surface object, for example a maneuver arrow. In some cases, safety-critical information is not sufficiently displayed to the driver.

SUMMARY

A need exists to provide an improved way for showing several items of information in a vehicle that is understandable and easily recognizable for the driver. The need is addressed by the subject matter of the independent claims. Embodiments of the invention are described in the dependent claims, the following description, and the drawings.

DESCRIPTION

Figure 1:
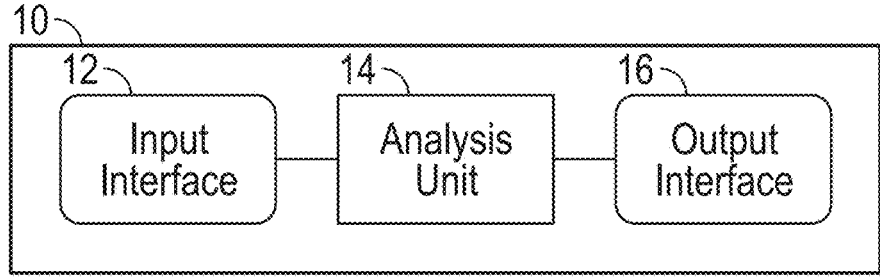
FIG. 1 shows a schematic depiction of an example device for the improved visualization of a first notice icon and a second notice icon in a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a device for the improved visualization of a first notice icon and a second notice icon in a motor vehicle is provided, comprising:

an input interface for receiving notice data with information about the first notice icon and the second notice icon and vehicle data with information about a vehicle state;

an analysis unit for determining an output configuration for the first notice icon and the second notice icon based on the notice data and the vehicle data, and for generating a control command to control an AR display device based on the output configuration;

an output interface for transmitting the control command to an AR display device, wherein the control command brings about a dynamic, modified output of the notice icons in order to increase visibility of the first and/or second notice icon.

In some embodiments, a system for the improved visualization of a first notice icon and a second notice icon in a motor vehicle is provided, comprising:

a device according to the teachings herein; and an AR display device for outputting a first notice icon predefined according to the output configuration and/or a second notice icon predefined according to the output configuration in response to a control command of the device.

In some embodiments, a method for the improved visualization of a first notice icon and a second notice icon in a motor vehicle is provided, comprising the steps of:

Receiving notice data with information about the first notice icon and the second notice icon and vehicle data with information about a vehicle state;

Determining an output configuration for the first notice icon and the second notice icon based on the notice data and the vehicle data;

Generating a control command for controlling an AR display device based on the output configuration;

Transmitting the control command to the AR display device, wherein the control command brings about a dynamic, modified output of the notice icons in order to increase visibility of the first and/or second notice icon.

By means of an input interface, a cost-effective device can be provided that for example can be used with available systems and units installed in the motor vehicle. An input interface can be designed to be wired and/or wireless, and can for example support one or more communication protocols. By means of an analysis unit, a beneficial output configuration can be determined in which visibility of the notice icons for the driver is increased. Since an output configuration can be determined based on the notice data and the vehicle data, the notice icons to be displayed can be responded to dynamically and depending on the situation. Safety in road traffic is increased. An output interface enables a cost-effective device that may be used with available output devices. By using an input interface for receiving data with information about the notice for the driver, a technically simple and economical device can be provided that, in particular, does not itself have to be designed to detect the information. Accordingly, the device can be integrated in already existing navigation or infotainment systems. By means of an output interface, components already installed in the motor vehicle can be used for displaying. It is furthermore conceivable to retrofit an AR display device and/or use several AR display devices in combination. For example, the first notice icon and the second notice icon are located in the context of augmented reality in a region in front of the motor vehicle. Then an overlap occurs due to the notice icon that is located closer to the motor vehicle.

In some embodiments, it is provided that the output interface is designed to transmit the control command to an AR display device in the form of an AR HUD. A control command for an AR HUD enables improved visualization of the information for a driver. In particular, a driver can direct his sight toward the roadway and does not have to look at an additional display in the motor vehicle. Safety in road traffic is increased.

In some embodiments, it is provided that the input interface is designed to receive configuration data with information about a driver's wish in order to enable a configuration of the output. This allows the driver to select a configuration that is understandable for him. The acceptance, the convenience and the understandability of the system can be improved and enhanced.

In some embodiments, it is provided that the device is designed for installation in a motor vehicle and is for example part of a vehicle computer, infotainment and/or navigation system. This can considerably increase the convenience during a drive. In particular, the device can be offered as a type of retrofit solution even for already purchased passenger cars and can be configured, for example, by replacing or reprogramming the vehicle's electronic system.

In some embodiments, it is provided that the input interface is designed to receive vehicle data with information about a vehicle state, which comprises a parallel display of at least two notice icons that at least partially overlap. As a result of this, the dynamic, modified output of the notice icons can be used particularly beneficially. Based on the partial overlap, a dynamic, modified output can be determined in an improved manner in order to increase visibility of both icons.

In some embodiments, it is provided that the analysis unit is designed to determine an output configuration for the first notice icon and the second notice icon, which comprises a dynamic adjustment of the salience of the first and/or second notice icon depending on the depiction and position of the second and/or first notice icon. By adjusting the salience, the focus of the driver can be guided to important information in a targeted manner. A dynamic adjustment here allows a highly variable and fast response to a new situation and thus new information that should be made accessible to the driver. In particular, with this dynamic, both very safety-relevant information, such as the warning that a preceding traffic participant is braking sharply, and non-safety-relevant information, such as a navigation notice, can be made accessible to the driver.

In some embodiments, it is provided that the dynamic adjustment of the salience comprises an adjustment of the occlusion, wherein for example the depiction of the first or second notice icon is at least partially omitted in the region of the overlap of the two notice icons; or the depiction of the first or second notice icon is graphically reduced. This can create the impression that the rear notice icon punches a hole in the front notice icon. The spatially front notice icon is thus omitted. Both notice icons can be perceived and transmit information.

In some embodiments, it is provided that the dynamic adjustment of the salience comprises a dynamic, temporal adjustment of the transparency and/or color saturation of the first and/or second notice icon depending on the depiction and position of the second and/or first notice icon; or comprises the depiction of the first and/or second notice icon in the form of a pointer. As a result, both notice icons can transmit information. In particular, a driver can intuitively recognize that a new notice icon was added. The comprehensibility of the first and/or second notice icon is high. A driver does not need to first learn the system in order to be able to process the information.

In some embodiments, it is provided that the dynamic adjustment of the salience comprises a dynamic adjustment of the fill of the first and/or second notice icon depending on the depiction and position of the second and/or first notice icon, wherein for example the output configuration for the first and/or second notice icon comprises an output of the border of the first and/or second notice icon. This enables the driver to look through the notice icon located closer to the motor vehicle. In particular, this allows both notice icons to be detected by the driver while maintaining their location.

In some embodiments, it is provided that the dynamic adjustment of the salience comprises a temporal morphing between various depictions of the first and/or second notice icon and/or various depiction durations of the first and/or second notice icon. This allows very high visibility and perception of both icons to be achieved. In particular, no modification of a notice icon needs to take place for this; icons that are known to the driver can be used to transmit information. This method can be used with a plurality of notice icons and can therefore be applied highly flexibly.

In some embodiments, it is provided that the notice data comprises information about a driving maneuver, for example a driving maneuver determined by a navigation system, and information about a detected preceding other motor vehicle, wherein the first notice icon is a maneuver arrow and the second notice icon is a marking of the detected preceding other motor vehicle. The disclosed teaching can be used here particularly beneficially, since this case occurs frequently in practice.

Example: A maneuver arrow is placed at an intersection and a vehicle ahead brakes before this intersection, and therefore it is marked to illustrate that the ego vehicle has detected this and will initiate a braking maneuver to avoid a collision. Both displays are relevant to the driver. However, if they were displayed one on top of the other without additional adjustment according to a plane concept, the maneuver arrow positioned "over" the marker would almost completely conceal the marking for the vehicle ahead. This would be both difficult to recognize and not very aesthetically pleasing.

In some embodiments, it is provided that the AR display device comprises a head-up display on a motor vehicle, wherein the head-up display is for example designed to show a first and second notice icon on a front windshield of a motor vehicle according to the output configuration. As a result, an output of the first and/or second notice icon according to the output configuration can take place in a technically simple manner. A projection unit of the head-up display and/or a mirror can be moved by means of actuators in order to enable a projection according to the output configuration. Furthermore, modular light sources and/or filters can be used. Of course, the various output configurations can also be created by a computing unit and corresponding rendering.

Further embodiments result from the remaining features specified in the dependent claims.

The various embodiments mentioned herein can beneficially be combined with one another, unless designed otherwise in individual cases.

Salience or conspicuousness for example means that a stimulus, in particular a notice icon, is emphasized from its context and is thereby more easily accessible to the awareness than a non-salient notice icon. Causes can be that the figure/ground contrast is high, or that the notice icon contradicts the expectations, or that the notice icon offers information about current destinations.

In the present case, occlusion is understood to mean at least partial touching or, respectively, overlapping of notice icons. A degree of occlusion can be modified by various changes to the notice icons.

Morphing for example describes a computer program-based method of changing an image gradually in a perceivable process without abrupt transitions such that a completely new image is created. In the present case, morphing is understood to mean in particular a periodic transition between two notice icons, wherein a switch is made gradually between a first notice icon and a second notice icon.

The head-up display (HUD) is a display system in which the user can maintain his viewing direction and therefore his head angle because the information is projected into his field of view. In addition to pilots, automobile drivers, inter alia, are included among the users. In particular, augmented reality (AR) can be combined with an HUD. AR means a computer-assisted expansion of the perception of reality. This information can be compatible with any human sensory modality. Frequently, however, augmented reality is only understood to mean the visual depiction of information, i.e., the addition of images or videos with computer-generated additional information on virtual objects by means of inserting/overlaying.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

FIG. 1 shows a schematic depiction of a device 10 for the improved visualization of a first notice icon and a second notice icon in a motor vehicle. The device 10 comprises an input interface 12, an analysis unit 14 and an output interface 16.

The input interface 12 is designed to receive data comprising notice data with information about the first notice icon and/or the second notice icon and vehicle data with information about a vehicle state. The data can for example comprise a speed or a navigation notice and, for example, originate from a tachometer, GPS receiver, and/or navigation system. Furthermore, the data can comprise sensor data from a driving assistance system such as a detected preceding vehicle, a recognized sign, or the like. For receiving, the input interface 12 is for example connected to a vehicle-internal transmission network. Furthermore, the input interface 12 can also be designed for wireless communication or be connected to a proprietary, e.g., wired transmission network.

The analysis unit 14 is designed to receive the data and generate a control command, wherein the control command brings about a dynamic, modified output of the notice icons in order to increase visibility of the first and/or second notice icon. The analysis unit 14 determines an output configuration for the first notice icon and the second notice icon based on the notice data and the vehicle data. An output configuration can comprise, for example, a modification of transparency or, respectively, opacity, color, color saturation, contrast, fill, a border, a simplification of a notice icon, and/or a duration of the depiction of one or more notice icons.

The output interface 16 is designed to transmit the control command to an AR display device. The output interface 16 can be designed analogous to the input interface 12 for communicating. Of course, the input interface 12 and the output interface 16 can also be designed combined as a communication interface for sending and receiving.

Figure 2:
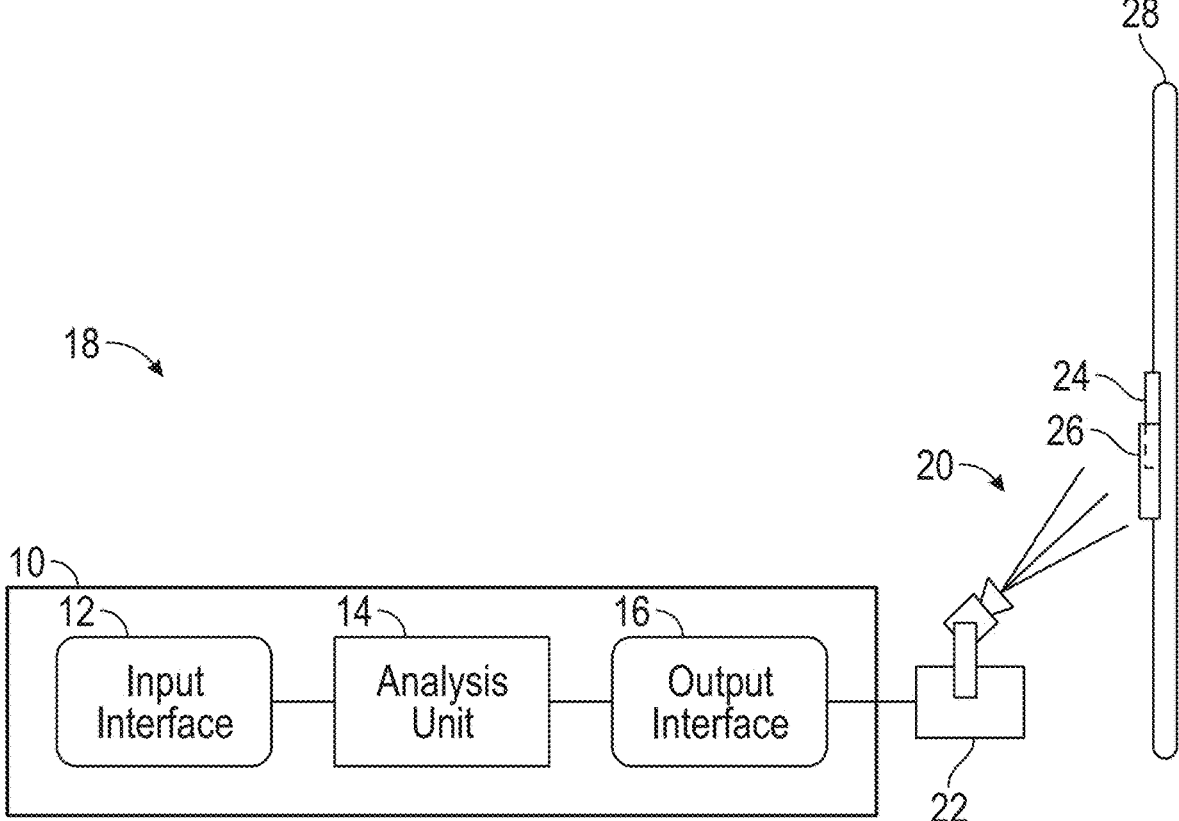
FIG. 2 shows a schematic depiction of an example variant of a system according to the teachings herein.

FIG. 2 shows a schematic depiction of a system 18 with a device 10 and an AR display device 20 with a projection unit 22.

The device 10 receives data comprising notice data and/or vehicle data. This data can for example be a speed of the motor vehicle, data from an eye tracking sensor, data on the traffic situation, motor vehicle position data, data concerning a position of a hazard source, etc.

Based on the data, the device 10 creates a control command for the AR display device 20 and thereby brings about a dynamic, modified output of a first notice icon 24 and a second notice icon 26 on a front windshield 28 of a motor vehicle. In the example shown, the AR display device 20 comprises a head-up display, wherein the projection unit 22 is designed to be movable and, for example, can be moved by actuators so that the notice icons 24, 26 can be projected onto the front windshield 28 at a position in the field of view of the driver. This allows the notice icons 24, 26 to be directly displayed on the front windshield 28 of the motor vehicle. In the example shown, the second notice icon 26 conceals the first notice icon 24 at least in portions; therefore, the analysis unit 14 determines a modified output of the notice icons 24, 26 in order to increase visibility of a or the first and/or second notice icon 24, 26.

Figure 3:
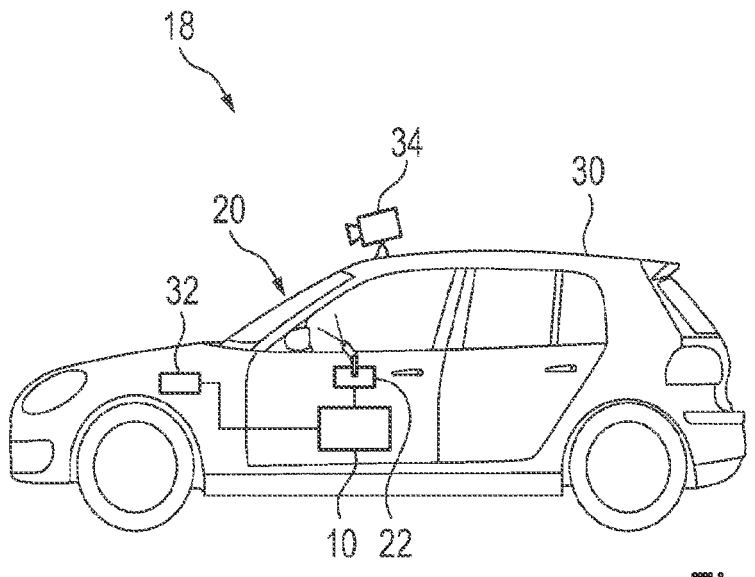
FIG. 3 shows a schematic depiction of another example variant of a system in a vehicle.

FIG. 3 shows a schematic depiction of a variant of the system 18 in a motor vehicle 30. The system 18 comprises a device 10 and an AR display device 20. In the shown example, the AR display device 20 comprises a projection unit 22 that can project onto the front windshield 28 (not shown in greater detail) of the motor vehicle 30.

As described above, the device 10 receives data comprising notice data and/or vehicle data. In the shown example, the system 18 is connected to a navigation system 32 and receives navigation data. Of course, the system 18 can also be designed as an independent unit. In the shown example, the navigation system 32 can form a unit that determines information such as a navigation request that is to be transmitted to a driver. Additional data can originate from a front camera 34, for example to determine a situation in front of the motor vehicle 30. Of course, other sensors can be used that are in principle known in the prior art. In particular, data from several sensors can be fused to achieve a higher data quality.

The device 10 analyzes the received data and determines a control command, which brings about an output configuration for the first notice icon 24 and the second notice icon 26 based on the notice data and the vehicle data such that the two notice icons 24, 26 are output according to the output configuration, as described above, and can be recognized by a driver.

Figure 4:
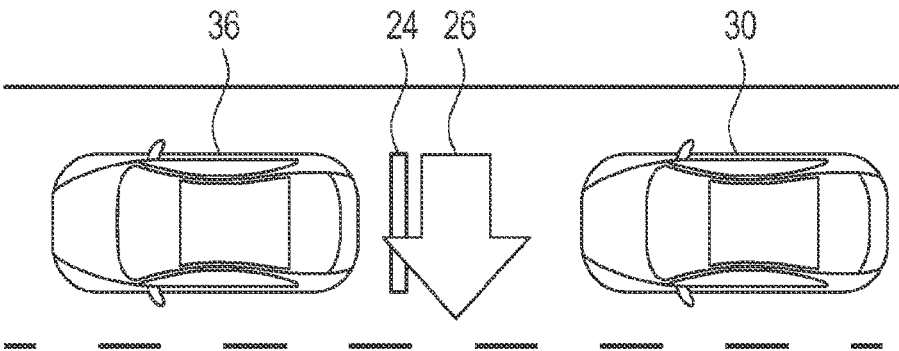
FIG. 4 shows a schematic depiction of a situation in road traffic from a bird's-eye perspective.
Figure 4:
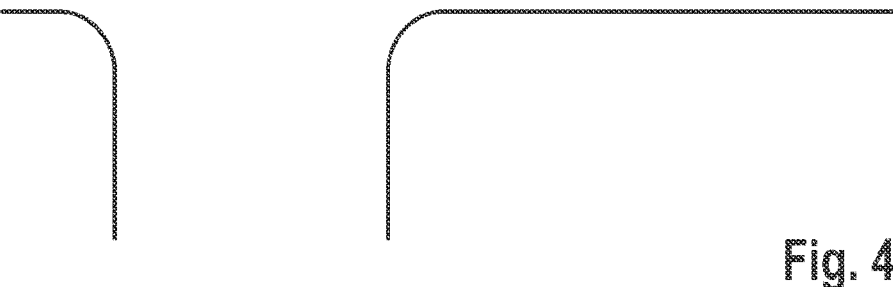

FIG. 4 schematically shows a situation in road traffic in which a motor vehicle 30 receives a navigation notice to turn left in the driving direction into a junction. Furthermore, a preceding other motor vehicle 36 that is performing a braking maneuver is detected by a sensor (not shown) of the motor vehicle 30.

The detected preceding other motor vehicle 36 is displayed to the driver by the first notice icon 24; the navigation notice is transmitted to the driver in the form of the second notice icon 26. Of course, the depiction of the notice icons 24, 26 on the roadway is only schematic and greatly simplified. When viewed from the motor vehicle 30, the second notice icon 26 conceals the first notice icon 24. Consequently, the device 10 determines an output configuration. Examples of such output configurations are shown in FIGS. 5a to 5h.

FIGS. 5a to 5h show various schematically simplified output configurations for a first notice icon 24 and a second notice icon 26. In the examples shown, the second notice icon 26 conceals the first notice icon 24 at least partially.

Figure 5A:
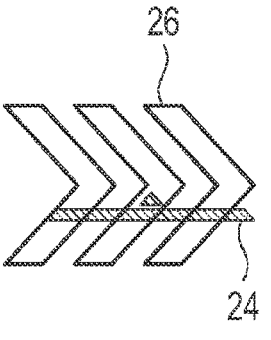
FIGS. 5a-h show schematic depictions of outputs of an example system on an AR display device.

The depiction of the notice icons 24, 26 according to FIG. 5a is dependent on a relative positioning of the location of the notice icons 24, 26 in the real world and on the flatness. Flat and therefore potentially concealing elements of the second notice icon 26 are reduced and, for example, only their border is shown so that the first notice icon 24 lying spatially behind can be better recognized and perceived.

Figure 5B:
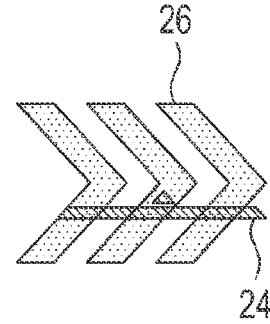

The depiction of the notice icons 24, 26 according to FIG. 5b is based on a salience of individual elements depending on a predefined relevance. For example, a transparency of the second notice icon 26 is reduced so that the first notice icon 24 lying spatially behind can be better recognized and perceived.

Figure 5C:
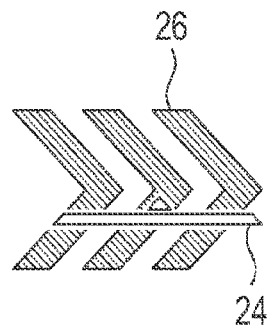

The depiction of the notice icons 24, 26 according to FIG. 5c is based on a gap, wherein spatially front displays are omitted. That means the rear element "punches a hole" in the front display. In the example shown, the elements of the second notice icon 26 are designed with gaps where they conceal the first notice icon 24 lying spatially behind. For better visibility, the gaps in the example shown are larger than the first notice icon 24 lying behind.

Figure 5D:
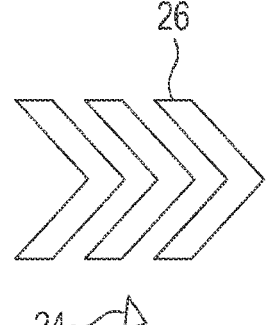

The depiction of the notice icons 24, 26 according to FIG. 5d shows a situation in which a first notice icon 24 is added to a second notice icon 26. In this case, the first notice icon 24 is shown simplified as a pointer and is not displayed augmented, meaning contact-analogous.

Figure 5E:
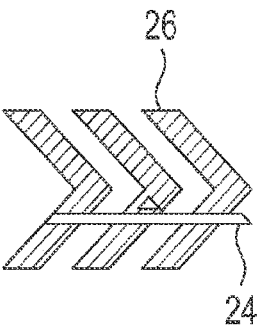

The depiction of the notice icons 24, 26 according to FIG. 5e is analogous to the one shown in FIG. 5b, wherein, instead of a transparency of the second notice icon 26, a color saturation is reduced so that the first notice icon 24 lying spatially behind can be better recognized and perceived.

Figure 5F:
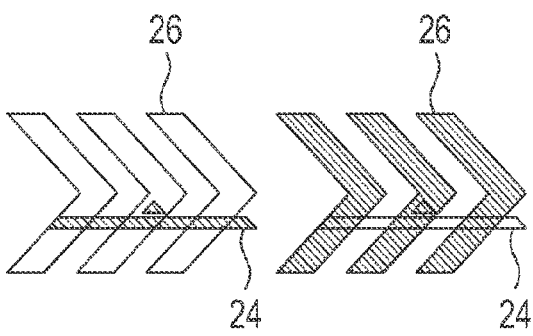
Figure 5G:
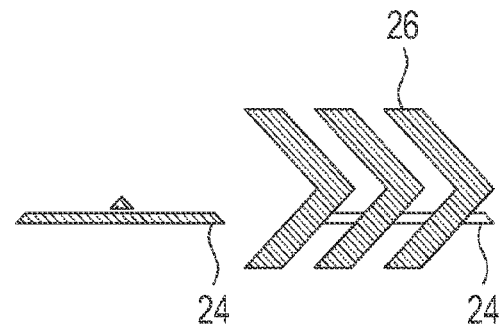
Figure 5H:
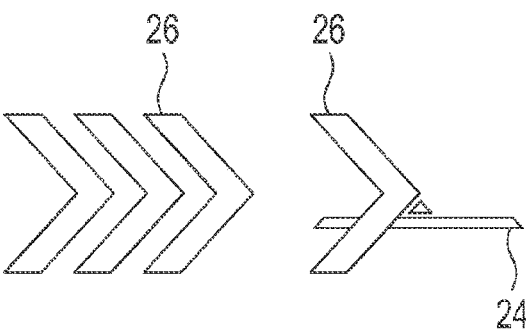

In FIGS. 5f to 5h, two points in time of a depiction of the notice icons 24, 26 that changes over time are shown in each case.

The depiction of the notice icons 24, 26 according to FIG. 5f shows a switch in salience of individual elements over the duration of the depiction. For example, first a maneuver arrow can be salient, then a marker can be salient, wherein the possibilities for salience variation already described above, such as transparency or color saturation, can be applied.

The depiction of the notice icons 24, 26 according to FIG. 5g shows a salience of individual elements that depends on the point in time at which they are displayed. For example, newer displays can be provided with higher salience. In the example shown, the second notice icon 26, meaning the maneuver arrow, was newly added and therefore has a higher salience.

The depiction of the notice icons 24, 26 according to FIG. 5h shows a graphically reduced display if several notice icons 24, 26 are shown. For example, a dynamic morphing between reduced and complete display takes place. In the example shown, the second notice icon 26, meaning the maneuver arrow, is reduced accordingly, wherein only one element is still shown instead of the three elements of the maneuver arrow. It should be understood that other another graphic reductions are also conceivable. In particular, it is also conceivable for the elements of the maneuver arrow to appear one after another.

Figure 6A:
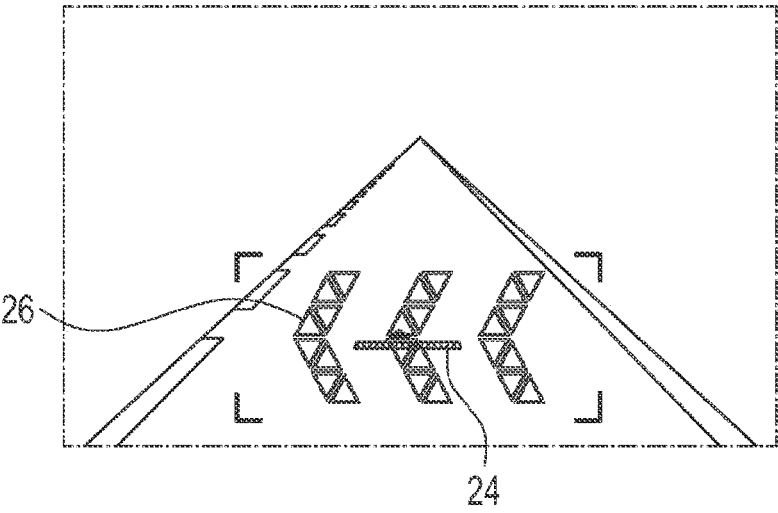
FIGS. 6a-b show schematic depictions of an output of an example system on an AR display device in a driving situation.
Figure 6B:
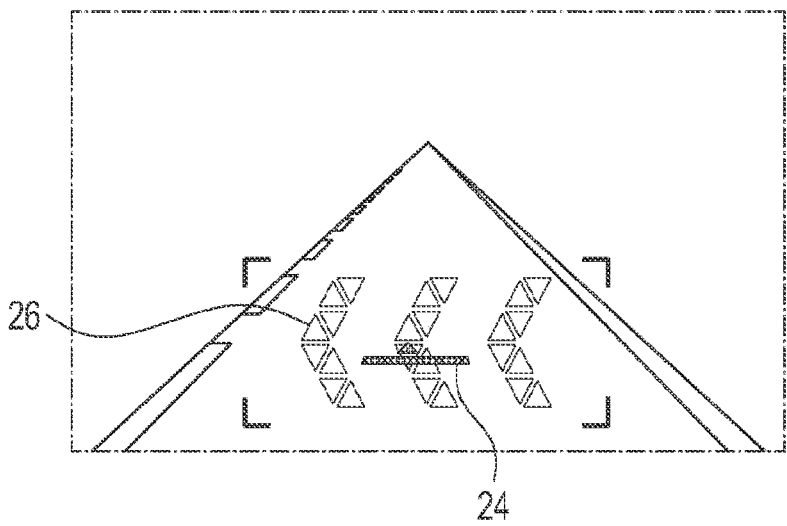

In FIGS. 6a and 6b, schematic depictions of an output of the system 18 are shown on an AR display device 20 in a driving situation, wherein, for reasons of simplicity, the preceding other motor vehicle 36 is not shown.

In the depiction of FIG. 6a, the first notice icon 24, which is designed in the form of a marking of a detected preceding other vehicle 36, is located behind the second notice icon 26, which is designed in the form of a maneuver arrow. Therefore, the individual elements of the maneuver arrow are not filled in; rather, only their border is shown. As a result, the location of the marking of a detected preceding vehicle and the location of the maneuver arrow can be recognized. Furthermore, both notice icons 24, 26 can be recognized.

In the depiction of FIG. 6b, in contrast to the depiction according to FIG. 6a, the first notice icon 24 is located in front of the second notice icon 26. Therefore, the individual elements of the maneuver arrow can be completely filled in. The location of the marking of a detected preceding vehicle and the location of the maneuver arrow can be recognized.

Figure 7:
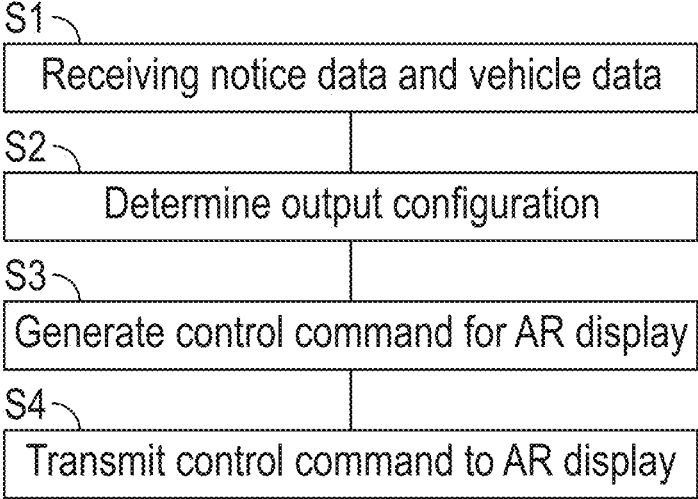
FIG. 7 shows a schematic depiction of steps of an example method according to the teachings herein.

FIG. 7 schematically shows the steps of a method for the improved visualization of a first notice icon 24 and a second notice icon 26 in a motor vehicle 30. The method may for example be performed with a system 18 and/or a device 10 as described above.

In a first step S1, notice data with information about the first notice icon 24 and the second notice icon 26 and vehicle data with information about a vehicle state is received.

In a second step S2, an output configuration for the first notice icon 24 and the second notice icon 26 is determined based on the notice data and the vehicle data.

In a third step S3, a control command is generated to control an AR display device 20 based on the output configuration.

In a fourth step S4, the control command is then transmitted to the AR display device 20.

The control command brings about a dynamic, modified output of the notice icons 24, 26 in order to increase visibility of the first and/or second notice icon 24, 26.

The invention has been described in detail. The discussed embodiments were only chosen by way of example to improve understanding of the invention. A person skilled in the art will recognize that the invention can be applied to a variety of notice icons. Moreover, a person skilled in the art will recognize that an application with more than two notice icons is also possible.

LIST OF REFERENCE NUMERALS

10 Device
12 Input interface
14 Analysis unit
16 Output interface
18 System
20 Augmented reality/AR display device
22 Projection unit
24 First notice icon
26 Second notice icon
28 Front windshield
30 Motor vehicle
32 Navigation system
34 Front camera
36 Preceding other motor vehicle
S1-S4 Method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A device for the improved visualization of a first notice icon and a second notice icon in a motor vehicle, comprising:

a network interface, connected with a vehicle-internal transmission network, the network interface being configured for receiving notice data with information about the first notice icon and the second notice icon and vehicle data with information about a vehicle state;

a processor for determining an output configuration for the first notice icon and the second notice icon based on the notice data and the vehicle data, and for generating a control command to control an augmented reality (AR) display based on the output configuration;

wherein the first notice icon represents safety-relevant information pertaining to a preceding vehicle and the second notice icon represents non-safety relevant vehicle guidance information; and wherein the control command provides a dynamic, modified output of the notice icons in order to increase visibility of the first notice icon over the second notice icon.

2. The device of claim 1, wherein the AR display is comprises an augmented reality head up display (AR HUD).

3. The device of claim 1, wherein the network interface is configured to receive configuration data with information about a driver's wish in order to enable a configuration of the output.

4. The device of claim 1, wherein the device is configured for installation in a motor vehicle.

5. The device of claim 1, wherein the network interface is configured to receive vehicle data with information about a vehicle state of the motor vehicle, which comprises a parallel display of at least two notice icons that at least partially overlap.

6. The device of claim 1, wherein the processor is configured to determine an output configuration for the first notice icon and the second notice icon, which comprises a dynamic adjustment of a salience of the first and/or second notice icon depending on a depiction and position of the second and/or first notice icon.

7. The device of claim 6, wherein the dynamic adjustment of the salience comprises an adjustment of an occlusion.

8. The device of claim 6, wherein the dynamic adjustment of the salience comprises a dynamic, temporal adjustment of a transparency and/or a color saturation of the first and/or second notice icon depending on a depiction and a position of the second and/or first notice icon; or comprises the depiction of the first and/or second notice icon as a pointer.

9. The device of claim 6, wherein the dynamic adjustment of the salience comprises a dynamic adjustment of a fill of the first and/or second notice icon depending on a depiction and a position of the second and/or first notice icon.

10. The device of claim 6, wherein the dynamic adjustment of the salience comprises a temporal morphing between various depictions of the first and/or second notice icon and/or various depiction durations of the first and/or second notice icon.

11. The device of claim 1, wherein the notice data comprises information about a driving maneuver and information about a detected preceding other motor vehicle, wherein the first notice icon is a maneuver arrow and the second notice icon is a marking of a detected preceding other motor vehicle.

12. The device of claim 2, wherein the network interface is configured to receive configuration data with information about a driver's wish in order to enable a configuration of the output.

13. The device of claim 1, wherein the device is configured as part of a vehicle computer, infotainment system and/or navigation system.

14. The device of claim 2, wherein the device is configured for installation in a motor vehicle.

15. The device of claim 3, wherein the device is configured for installation in a motor vehicle.

16. The device of claim 2, wherein the network interface is configured to receive vehicle data with information about a vehicle state, which comprises a parallel display of at least two notice icons that at least partially overlap.

17. A system for the improved visualization of a first notice icon and a second notice icon in a motor vehicle, comprising:

a device of claim 1; and an augmented reality (AR) display for outputting a first notice icon predefined according to the output configuration and/or a second notice icon predefined according to the output configuration in response to a control command of the device.

18. The system of claim 17, wherein the AR display comprises a head-up display on a motor vehicle, wherein the head-up display is to show a notice icon on a front windshield of a motor vehicle according to the output configuration.

19. A method for the improved visualization of a first notice icon and a second notice icon in a motor vehicle, comprising:

receiving notice data with information about the first notice icon and the second notice icon and vehicle data with information about a vehicle state;

determining an output configuration for the first notice icon and the second notice icon based on the notice data and the vehicle data, wherein the first notice icon represents safety-relevant information pertaining to a preceding vehicle and the second notice icon represents non-safety relevant vehicle guidance information;

generating a control command for controlling an augmented reality (AR) display based on the output configuration;

transmitting the control command to the AR display, wherein the control command provides a dynamic, modified output of the notice icons in order to increase visibility of the first notice icon over the second notice icon.

20. A non-transient storage medium comprising instructions that when executed by a processor causes the processor to conduct the method of claim 19.

\*    \*    \*    \*    \*